UNITED STATES PATENT OFFICE.

RUDOLF WEYEL, OF BÜRRIGERHEIDE, GERMANY, ASSIGNOR, BY MESNE ASSIGNMENTS, TO RHEINISCHE DYNAMITFABRIK, OF COLOGNE, GERMANY.

METHOD FOR FACILITATING THE SEPARATION OF NITROGLYCERIN.

1,138,916.     Specification of Letters Patent.     Patented May 11, 1915.

No Drawing.     Application filed November 25, 1912. Serial No. 733,324.

*To all whom it may concern:*

Be it known that I, RUDOLF WEYEL, a subject of the German Emperor, of Bürrigerheide, in the Rhine Province, in the Kingdom of Prussia, Germany, have invented a certain new and useful Improvement in Methods for Facilitating the Separation of Nitroglycerin, and do hereby declare that the following is a full, clear, and exact description thereof.

My invention relates to a process for shortening the time required for the separation of nitroglycerin from the acids which have been used for the manufacture of the same, thereby minimizing the element of danger which is present in the separation. It has been proposed to add certain substances during the production of the nitroglycerin in order to facilitate the separation of the nitroglycerin, the substances suggested being paraffin oil, hydrofluoric acid or fluorids and soluble silicates of the alkalis or alkaline earths. The use of paraffin oil is, however, disadvantageous inasmuch as an undesirable mud is formed on the surface of the nitroglycerin in the separating tank, and on the glasses in the second separation. For these reasons paraffin oil is only used in the cases where the degree of separation has been exceedingly poor. The use of soluble silicates of the alkalis or alkaline earths has been found to be not entirely effective as soluble silicates retard the separation owing to their emulsifying character. In the manner in which hydrofluoric acid and fluorids have been previously used to induce the separation of the nitroglycerin, these substances were used to remove the emulsified siliceous compounds present in the acids used for treating the glycerin, on the theory that the presence of such siliceous compounds had a tendency to interfere with the rise of the nitroglycerin to the surface of the acids. It was therefore understood that the use of hydrofluoric acid or fluorids would be advantageous only in case of the presence of such siliceous compounds.

I have found that in those cases in which silica or siliceous compounds are absent, the addition of chemically pure sodium fluorid or hydrofluoric acid is always ineffective, and that in all cases the best effect is obtained when care is taken to produce a quantity of gaseous silicon fluorid by the presence of insoluble siliceous compounds. The production of gaseous silicon fluorid results in loosening the mixture and opening the way for the rise of the nitroglycerin, which has a lower specific gravity than the acids used for producing the same, and the use of insoluble compounds of silica to produce the silicon fluorid avoids any tendency to emulsification which is present in the case of soluble silicon compounds. One way of causing the liberation of silicon fluorid in this manner is by adding to the acids a mixture of sodium fluorid and an insoluble siliceous compound, such as silica or one of the insoluble silicates. The reaction which takes place is the following:

Care should be taken to add the fluorid and siliceous compound at the proper time for the reason that if they are added too soon the air agitation will drive off the silicon fluorid before the formation of the nitroglycerin, and if they are added too late there will not be sufficient time to allow the silicon fluorid to form.

In carrying out the process it has been found advantageous to mix sodium fluorid with about 8 to 10% of its own weight of fine, washed, light kieselguhr, and to add about 20 g. of this mixture to 100 kg. of the glycerin at from five to six minutes before the end of the nitration. It will be found, in carrying out the process in this manner, that the time for the separation of the nitroglycerin will be about one-third of its normal duration.

It will be understood that the process may be carried out in many different ways so long as the same result is obtained. Instead of utilizing a mixture of fluorids and a siliceous compound other substances may be used which will be acted upon by the acids similarly to liberate silicon fluorid. One substance of this character which may be used is sodium fluosilicate. In carrying out my invention with this compound, the reaction is as follows:

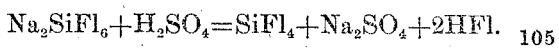

In using sodium fluosilicate, from 10 to 15 g. thereof should be added to 100 kg. of glycerin. It will be noted that in this reaction there is an excess of hydrofluoric acid formed and it is therefore advisable to add to the sodium fluosilicate about 10% of silica, preferably in the form of kieselguhr. When using silica with the sodium fluosilicate, even a smaller quantity of the materials may be added to bring about the separation of the nitroglycerin in the same period of time.

While I have described my invention above in detail, I wish it to be understood that many changes may be made therein without departing from the spirit thereof.

I claim:

1. The method of facilitating the separation of a mixture of liquids containing nitroglycerin and an acid, which comprises generating silicon fluorid in said liquids by the addition of a fluosilicate.

2. The method of facilitating the separation of a mixture of liquids having different specific gravities, containing nitroglycerin and an acid, which comprises generating silicon fluorid in said liquids by the addition of a fluosilicate.

3. The method of facilitating the separation of a mixture of liquids containing nitroglycerin and an acid, which comprises generating silicon fluorid in said liquids by the addition of a fluosilicate and siliceous compound.

4. The method of facilitating the separation of a mixture of liquids having different specific gravities, containing nitroglycerin and an acid, which comprises generating silicon fluorid in said liquids by the addition of a fluosilicate and siliceous compound.

5. The method of facilitating the separation of a mixture of liquids containing nitroglycerin and an acid which comprises generating silicon fluorid in said liquids by the addition of sodium fluosilicate.

6. The method of facilitating the separation of a mixture of liquids containing nitroglycerin and an acid which comprises generating silicon fluorid in said liquids by the addition of sodium fluosilicate and silica.

7. The method of facilitating the separation of a mixture of liquids containing nitroglycerin and an acid which comprises generating silicon fluorid in said liquids by the addition of sodium fluosilicate and kieselguhr.

In testimony that I claim the foregoing I have hereunto set my hand.

RUDOLF WEYEL.

Witnesses:
CHAS. VANDORY,
KARL KNAPP.